(12) United States Patent
Williams et al.

(10) Patent No.: US 6,900,826 B2
(45) Date of Patent: May 31, 2005

(54) MULTIPLE RESOLUTION HELICAL IMAGING SYSTEM AND METHOD

(75) Inventors: Richard A. Williams, Hampstead, NH (US); Craig Wood, Litchfield, NH (US)

(73) Assignee: Presstek, Inc., Hudson, NH (US)

( * ) Notice: Subject to any disclaimer, the term of this patent is extended or adjusted under 35 U.S.C. 154(b) by 30 days.

(21) Appl. No.: 10/369,320

(22) Filed: Feb. 19, 2003

(65) Prior Publication Data

US 2003/0218667 A1 Nov. 27, 2003

Related U.S. Application Data

(60) Provisional application No. 60/358,077, filed on Feb. 19, 2002.

(51) Int. Cl.$^7$ ............................................... B41J 2/435
(52) U.S. Cl. ................................. 347/248; 347/234
(58) Field of Search ............................ 101/453–467; 347/224, 241, 242, 248, 234

(56) References Cited

U.S. PATENT DOCUMENTS

| | | | |
|---|---|---|---|
| 1,071,815 A | 9/1913 | Sperry | |
| 1,635,027 A | 7/1927 | Belin | |
| 1,699,169 A | 1/1929 | Thurstone | |
| 2,478,555 A | 8/1949 | Yule | |
| 2,510,200 A | 6/1950 | Thompson | |
| 2,529,978 A | 11/1950 | Thompson | |
| 2,578,307 A | 12/1951 | Hunt | |
| 2,815,397 A | 12/1957 | Stamps | |
| 2,872,825 A | 2/1959 | Van Doren | |
| 3,523,160 A | 8/1970 | Willey | |
| 3,956,583 A | 5/1976 | Pugsley | |
| 3,970,781 A | * 7/1976 | Dalton et al. | ............... 358/480 |
| 3,977,760 A | 8/1976 | Ullstig | |
| 4,010,320 A | 3/1977 | Kudlich | |
| 4,040,095 A | 8/1977 | Abrams | |
| 4,127,870 A | 11/1978 | Colditz | |
| 4,203,136 A | 5/1980 | Wellendorf et al. | |
| 4,268,870 A | 5/1981 | Kitamura et al. | |
| 4,305,093 A | 12/1981 | Nasu | |
| 4,366,509 A | 12/1982 | Norrell et al. | |
| 4,402,265 A | 9/1983 | Pickard | |
| 4,428,000 A | * 1/1984 | Kuehnle et al. | ............ 358/300 |
| 4,541,020 A | 9/1985 | Kimura | |
| 4,578,577 A | 3/1986 | Noguchi | |
| 4,587,900 A | 5/1986 | Oshio | |
| 4,745,487 A | 5/1988 | Nishikawa | |
| 4,890,553 A | 1/1990 | Turner | |
| 4,897,737 A | 1/1990 | Shalev | |
| 4,992,890 A | * 2/1991 | Pinard et al. | ............... 358/474 |
| 5,111,744 A | 5/1992 | Wieland | |
| 5,153,769 A | 10/1992 | Rubinstein et al. | |
| 5,174,205 A | 12/1992 | Kline et al. | |
| 5,309,835 A | 5/1994 | Hartung et al. | |
| 5,321,684 A | 6/1994 | Schaefer et al. | |
| 5,331,892 A | 7/1994 | Seib et al. | |
| 5,351,617 A | 10/1994 | Williams et al. | |
| 5,385,092 A | 1/1995 | Lewis et al. | |
| 5,394,614 A | 3/1995 | Lindner et al. | |
| 5,416,984 A | 5/1995 | Murray | |
| 2002/0005890 A1 | 1/2002 | Beier et al. | |

(Continued)

FOREIGN PATENT DOCUMENTS

| | | |
|---|---|---|
| EP | 0 878 773 A2 | 11/1998 |
| EP | 0 947 950 A2 | 10/1999 |
| JP | 58111566 | 7/1983 |
| JP | 62139523 | 6/1987 |

*Primary Examiner*—Andrew H. Hirshfeld
*Assistant Examiner*—Marissa Ferguson
(74) *Attorney, Agent, or Firm*—Goodwin Procter, LLP (57) ABSTRACT

A multiple resolution imaging system employs an array of imaging devices each tracing a helical pattern on a recording medium. The imaging devices may be activated sequentially along multiple interlaced helical paths to allow a selectable image resolution with reduced imaging artifacts.

22 Claims, 6 Drawing Sheets

U.S. PATENT DOCUMENTS

| | | |
|---|---|---|
| 5,521,748 A | 5/1996 | Sarraf |
| 5,548,408 A | 8/1996 | Koren |
| 5,596,928 A | 1/1997 | Marmin et al. |
| 5,598,780 A | 2/1997 | Marmin et al. |
| 5,668,588 A * | 9/1997 | Morizumi et al. .......... 347/242 |
| 5,691,759 A | 11/1997 | Hanson |
| 5,715,752 A | 2/1998 | Rother et al. |
| 5,767,887 A * | 6/1998 | Warner et al. .............. 347/115 |
| 5,774,248 A | 6/1998 | Komatsu |
| 5,875,718 A | 3/1999 | Schild et al. |
| 5,896,162 A * | 4/1999 | Taniguchi ................... 347/244 |
| 5,990,925 A | 11/1999 | Sousa et al. |
| 6,037,962 A | 3/2000 | Hanson et al. |
| 6,182,569 B1 | 2/2001 | Rorke et al. |
| 6,182,570 B1 | 2/2001 | Rorke et al. |
| 6,186,067 B1 | 2/2001 | Rorke et al. |
| 6,192,798 B1 | 2/2001 | Rorke et al. |
| 6,222,577 B1 | 4/2001 | Sousa |
| 6,348,358 B1 | 2/2002 | Sousa et al. |
| 6,357,352 B1 | 3/2002 | Rorke et al. |
| 6,452,623 B2 | 9/2002 | Sousa |
| 6,490,975 B1 | 12/2002 | Rorke et al. |
| 6,497,178 B1 | 12/2002 | Rorke et al. |
| 6,598,526 B2 | 7/2003 | Rorke et al. |
| 6,712,442 B1 * | 3/2004 | Pickett ....................... 347/15 |

\* cited by examiner

MULTIPLE RESOLUTION HELICAL IMAGING SYSTEM AND METHOD

RELATED APPLICATION

This application claims the benefit of U.S. Provisional Application No. 60/358,077, filed Feb. 19, 2002, the entire disclosure of which is hereby incorporated by reference.

BACKGROUND OF THE INVENTION

1. Field of the Invention

The present invention relates to digital imaging systems and methods, and more particularly to digital imaging systems that apply image information along helical paths.

2. Description of the Related Art

In many digital graphic-arts applications, recording media are imaged by arrays of imaging devices. For example, to circumvent the cumbersome photographic development, plate-mounting and plate-registration operations that typify traditional printing technologies, practitioners have developed electronic alternatives that store the imagewise pattern in digital form and impress the pattern directly onto the plate or recording medium. Plate-imaging devices amenable to computer control include various forms of lasers. For example, U.S. Pat. Nos. 5,351,617 and 5,385,092 disclose ablative recording systems that use low-power laser discharges to remove, in an imagewise pattern, one or more layers of a lithographic printing blank, thereby creating a ready-to-ink printing member without the need for photographic development. In accordance with those systems, laser output is guided from the diode to the printing surface and focused onto that surface (or, desirably, onto the layer most susceptible to laser ablation, which will generally lie beneath the surface layer). Other systems use laser energy to cause transfer of material from a donor to an acceptor sheet, to record non-ablatively, or as a pointwise alternative to overall exposure through a photomask or negative.

In such systems, the imaging devices are spaced apart by a distance (the "device pitch") much greater than the resolution—i.e., the distance between image dots (the "dot pitch") as they appear on the recording medium. The devices are located adjacent to a cylinder, and as the cylinder rotates, the devices each image a series of circumferential rings. That is, each device images through a full rotation of the cylinder, producing a line of the image on the recording medium. The devices are then advanced axially, i.e., indexed, one unit of resolution along the cylinder to image the next circumferential line. Typically the recording medium is in the form of a sheet pinned to the cylinder; the circumferential region along the cylinder between the ends of the recording medium is a gap or "void" segment, and it is when the devices overlie this area that they are advanced.

An alternate mode of imaging follows a spiral or helical pattern. Instead of a series of sequential rings, an imaging device traces a continuous helix over the plate cylinder. In one known arrangement, each device in a linear array is advanced one unit of resolution (i.e., the dot pitch) during each rotation of the cylinder. The devices are each responsible for imaging an adjacent zone, so the end of the helical path followed by one device coincides with the point at which the next device began its helical path. As a result, the final image is a continuous helix. This approach requires no indexing of the imaging devices, and can image over a continuous cylindrical recording medium without a void. Unfortunately, because the zones are adjacent, this type of system produces visible artifacts arising from differences in the imaging characteristics of adjacent devices.

DESCRIPTION OF THE INVENTION

3. Brief Summary of the Invention

In accordance with this invention, the regions of the recording medium traversed by adjacent imaging devices are interlaced. By interlacing regions mixed by the different devices, differences in device imaging characteristics are aggregated and thereby rendered less noticeable. For example, susceptibility to periodic imaging artifact such as the Moire effect is reduced. The amount of axial distance traversed by a device during one cylinder rotation (the "helical step pitch") is the device pitch or a fraction thereof rather than the much smaller dot pitch. As a result, each device traces a wide spiral across the cylinder. The space between turns imaged by the first device is addressed by "downstream" devices whose helices are identical in pitch but offset, so that downstream devices subsequently and successively image the space unaddressed by the upstream devices; that is, the imaging devices are activated and de-activated sequentially rather than simultaneously. A small number of revolutions at the onset (preamble) and the end (postamble) of each imaging cycle occurs during which only some devices are active to initiate and terminate the interlace. So long as the number of devices is not excessive, the extra rotations do not significantly increase overall imaging time relative to the circumferential-ring approach.

In addition, in accordance with the invention, a fixed device pitch can nonetheless be operated to image at different resolutions by varying the helical step pitch.

Accordingly, in a first aspect, an apparatus for imaging a recording medium in accordance with the invention includes a means for supporting a recording medium, an array of imaging devices positioned adjacent to the supporting means, and a means for rotating the supporting means about an axis. The image apparatus further includes a means for axially translating the array along the supporting means and a controller for causing the imaging devices to apply on the recording medium a pattern of dots corresponding to an image. The controller operates the imaging devices so that each device applies dots along a helical path interlacing with the helical paths of the other devices.

In preferred embodiments, the helical paths traversed by the devices are identical in pitch but offset with respect to one another. Each device addresses space on the recording medium that is not addressed by any previously activated device. The pattern of dots applied in a helical pattern may correspond to one of a plurality of selectable image resolutions. The imaging devices are spaced apart by a device pitch and the applied dots are spaced apart by a dot pitch, the device pitch being greater than the dot pitch.

In a second aspect, the invention comprises an imaging method. A recording medium and an array of imaging devices is provided. The recording medium is rotated adjacent to the imaging devices about an axis and the imaging devices apply on the recording medium a pattern of dots corresponding to an image, each of the devices applying dots along a helical path interlacing with the helical paths of the other devices.

It is therefore an object of the invention to provide an imaging system and method which reduces imaging error and artifacts inherent to the periodic aspect of conventional circumferential or helical imaging approaches.

It is an additional object of the invention to provide an imaging system and method capable of operation in multiple resolutions by selective operation of the component imaging devices.

It is a further object of the invention to provide an imaging system and method having reduced manufacturing cost and complexity. The helical imaging approach obviates the need for the rapid, high-impulse movement of the imaging array and the recording medium support during a non-imaging portion of the imaging cycle and the mechanical subsystems necessary to accommodate such movement. Accordingly, no discrete indexing of the imaging array is required and continuous recording is permitted.

The foregoing and other objects, features and advantages of the present invention disclosed herein, as well as the invention itself, will be more fully understood from the following description of preferred embodiments and claims, when read together with the accompanying drawings. In the drawings, like reference characters generally refer to the same parts throughout the different views. The drawings are not necessarily to scale, emphasis instead generally being placed upon illustrating the principles of the invention.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
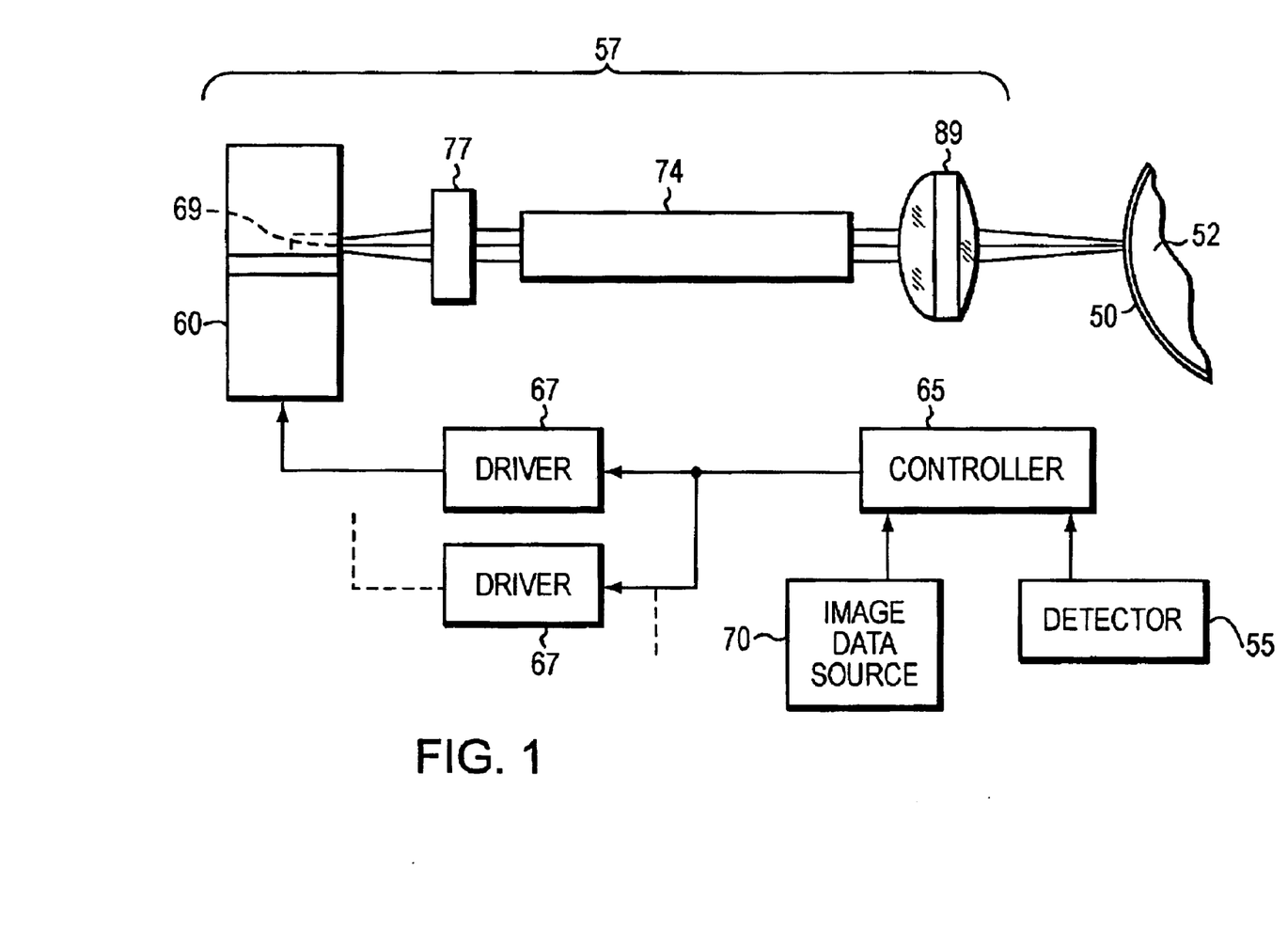
FIG. 1 schematically illustrates the basic components of the imaging apparatus in of the invention as implemented in a representative environment.

Refer first to FIG. 1, which schematically illustrates the basic components of the environment to which the invention may be applied. A recording medium 50, such as a lithographic plate blank or other graphic-arts construction, is affixed to a support during the imaging process. In the depicted implementation, that support is a cylinder 52, around which recording medium 50 is wrapped. If desired, cylinder 52 may be straightforwardly incorporated into the design of a conventional lithographic press, serving as the plate cylinder of the press. Cylinder 52 is supported in a frame and rotated by a standard electric motor or other conventional means. The angular position of cylinder 52 is monitored by a shaft encoder associated with a detector 55. The optical components of the invention, organized as an array of imaging devices each containing the components indicated at 57, may be mounted in a writing head adapted for axial movement. In other embodiments, the optical components of the invention comprise closely spaced and individually operable diode lasers as described in U.S. Pat. No. 6,348,358, commonly owned with the present application and hereby incorporated by reference.

Imaging radiation, which strikes recording medium 50 so as to effect an imagewise scan, originates with one or more pumping laser diodes 60. The optical components discussed below concentrate the entire laser output onto recording medium 50 as a small feature, resulting in high effective power densities. A controller 65 operates a laser driver 67 to produce an imaging burst when appropriate points on recording medium 50 reach opposition to the output slit 69 of laser 60. In general the driver preferably includes a pulse circuit capable of generating at least 100,000 laser-driving pulses/second, with each pulse being relatively short, i.e., on the order of microseconds.

As suggested in the figure, controller 65 governs operation of all the devices 57 in the array, and receives data from two sources. The angular position of cylinder 52 with respect to the laser output is constantly monitored by detector 55, which provides signals indicative of that position to controller 65. In addition, an image data source (e.g., a computer) 70 also provides data signals to controller 65. The image data provides relative reference points on recording medium 50 where image spots are to be written. Controller 65, therefore, correlates the instantaneous relative positions of laser 60 and recording medium 50 (as reported by detector 55) with the image data to actuate the appropriate laser drivers at the appropriate times during scan of recording medium 50. The driver and control circuitry required to implement this scheme is well-known in the scanner and plotter art; suitable designs are described in U.S. Pat. Nos. 5,385,092 and 5,174,205, both commonly owned with the present application and hereby incorporated by reference.

The output of laser 60 is delivered to the recording medium 50 through a fiber-optic cable 74. A lens 77 concentrates the output of laser 60 to the fiber-optic cable 74. Radiation disperses as it exits slit 69 of laser 60, diverging at the slit edges. Generally the dispersion is of primary concern; this dispersion is reduced using a divergence-reduction lens 77. A preferred configuration is a completely cylindrical lens, essentially a glass rod segment of proper diameter (as illustrated); however, other optical arrangements, such as lenses having hemispheric cross-sections or which correct both fast and slow axes, can also be straightforwardly implemented.

The highly collimated, low-NA output of the fiber-optic cable 74 is focused onto the surface (or an appropriate inner layer) of recording medium 50 by a lens 89, which may be a convex lens (as illustrated), a plano-convex lens or other suitable optical arrangement. The laser, laser crystal and optical components are normally carried in a single elongated housing. Recording medium 50 responds to the imaging radiation emitted by laser 60, e.g., through ablation of an imaging layer or by non-ablative transfer of material from a donor to an acceptor sheet.

Figure 2:
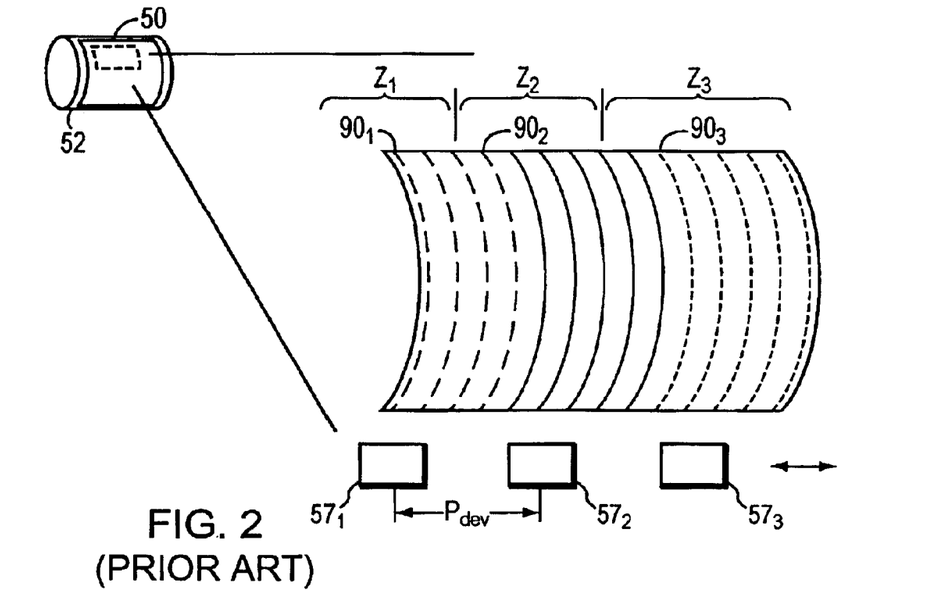
FIG. 2 is a perspective view of circumferential imaging on a cylindrical support medium.

FIG. 2 depicts a known system for imaging a recording medium 50 affixed to cylindrical recording support 52 with imaging devices $57_1$, $57_2$ and $57_3$ (collectively 57) located adjacent to cylindrical support 52. Typically, imaging devices 57 are disposed in a single array, and are separated from each other by the device pitch, $P_{dev}$. As cylindrical support 52 rotates, the devices 57 image through a full rotation of the cylindrical support 52, thereby producing a line $90_1$, $90_2$, $90_3$ of the image on the recording medium 50. Devices 57 are then indexed along cylindrical support 52 to image the next circumferential lines. If the devices 57 are spaced far enough apart, they can each image within a single continuous zone along the cylindrical support 52 (e.g., $Z_1$, $Z_2$, and $Z_3$ as shown) adjacent to the zone served by the next device. Accordingly, the imaging devices 57 are advanced axially over the zone width in increments equal to the dot pitch, $P_{dot}$. The image resolution may also be expressed as the reciprocal of $P_{dot}$ in dots per millimeter.

Figure 3:
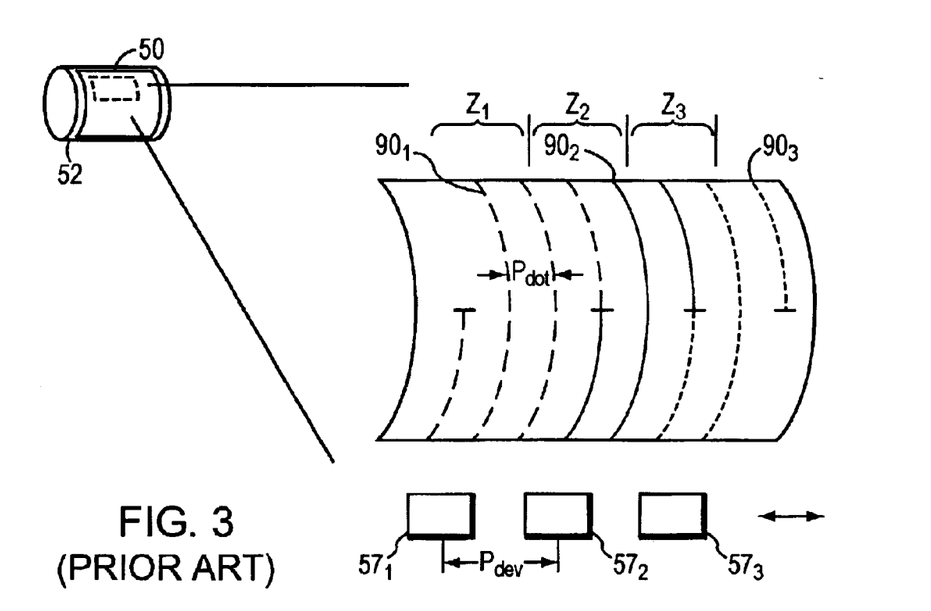
FIG. 3 is a perspective view of helical imaging on a cylindrical support medium.

FIG. 3 depicts a known system for imaging a recording medium utilizing a spiral or helical pattern. Instead of a series of sequential circumferential rings as shown in FIG. 2, imaging devices 57 trace a continuous helix over the recording medium 50. In the illustrated prior art arrangement, the devices 57 are all advanced one unit of resolution during each rotation of the cylindrical support 52. Each device 57 images within a zone (e.g., $Z_1$, $Z_2$, and $Z_3$, as shown); the region imaged by device $57_1$ is represented by long dashes, that imaged by device $57_2$ is represented by a solid line and that imaged by device $57_3$ by short dashes. Although each zone is shown as extending over only a few passes for clarity, it is evident that the end of the path followed by one device (for example, $57_1$) coincides with point at which the next device (for example, $57_2$) begins imaging. Consequently, the final image is a continuous helix composed of the separate but contiguous helical contributions of the individual devices. This approach requires no indexing and permits continuous recording.

Figure 4:
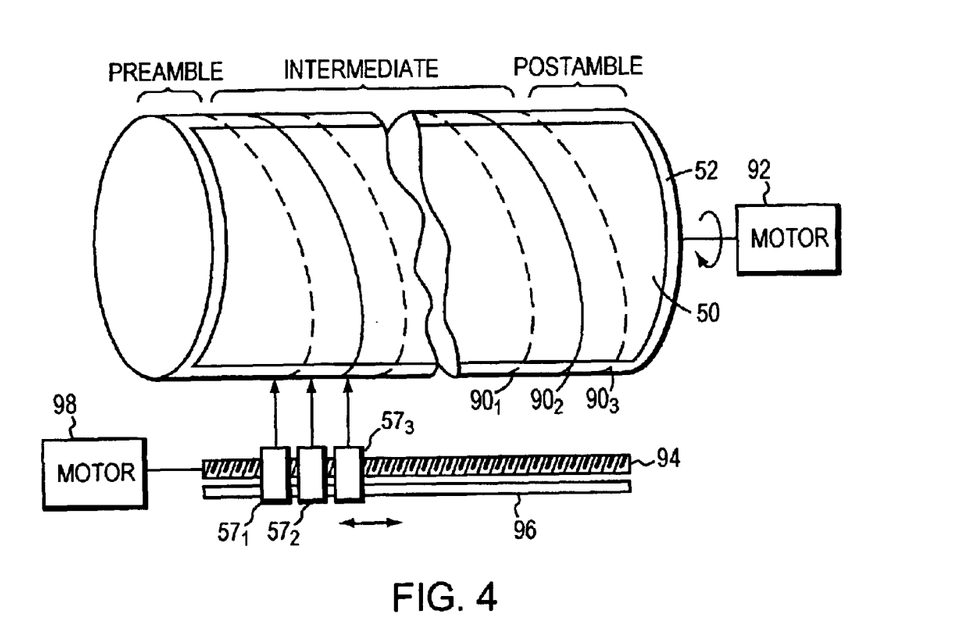
FIG. 4 is a perspective view of the interlaced helical imaging system in accordance with the invention.

FIG. 4 depicts one embodiment in accordance with this invention, wherein the regions traversed by adjacent devices 57 are interlaced. Although device 57 is depicted comprising an array of three imaging devices, device 57 is not so limited and may comprise any suitable number of devices. Devices 57 may move along on a lead screw 94 and guide bar 96 so as to traverse recording medium 50 as it rotates. Axial movement of the writing head results from rotation of a motor 98, which turns the lead screw 94 and thereby causes the writing head to move axially along cylinder 52.

Recall that the distance between adjacent image devices 57 is the device pitch $P_{dev}$, while the distance between the image dots is the dot pitch $P_{dot}$. The amount of axial distance traversed by device 57 during one cylindrical support 52 rotation is the helical step pitch (the "HSP"). The HSP is equal to the number of imaging devices multiplied by the dot pitch, $P_{dot}$, and generally differs from the device pitch. For example, if the HSP is greater than the device pitch, each device 57 will trace a wide spiral across the cylinder. The space within the region imaged by the first device (for example, $57_3$) is addressed by "downstream" devices (for example $57_2$) whose helices are identical in pitch but offset, so that downstream devices subsequently and successively image the space unaddressed by the upstream devices until the image is completed.

Figure 5:
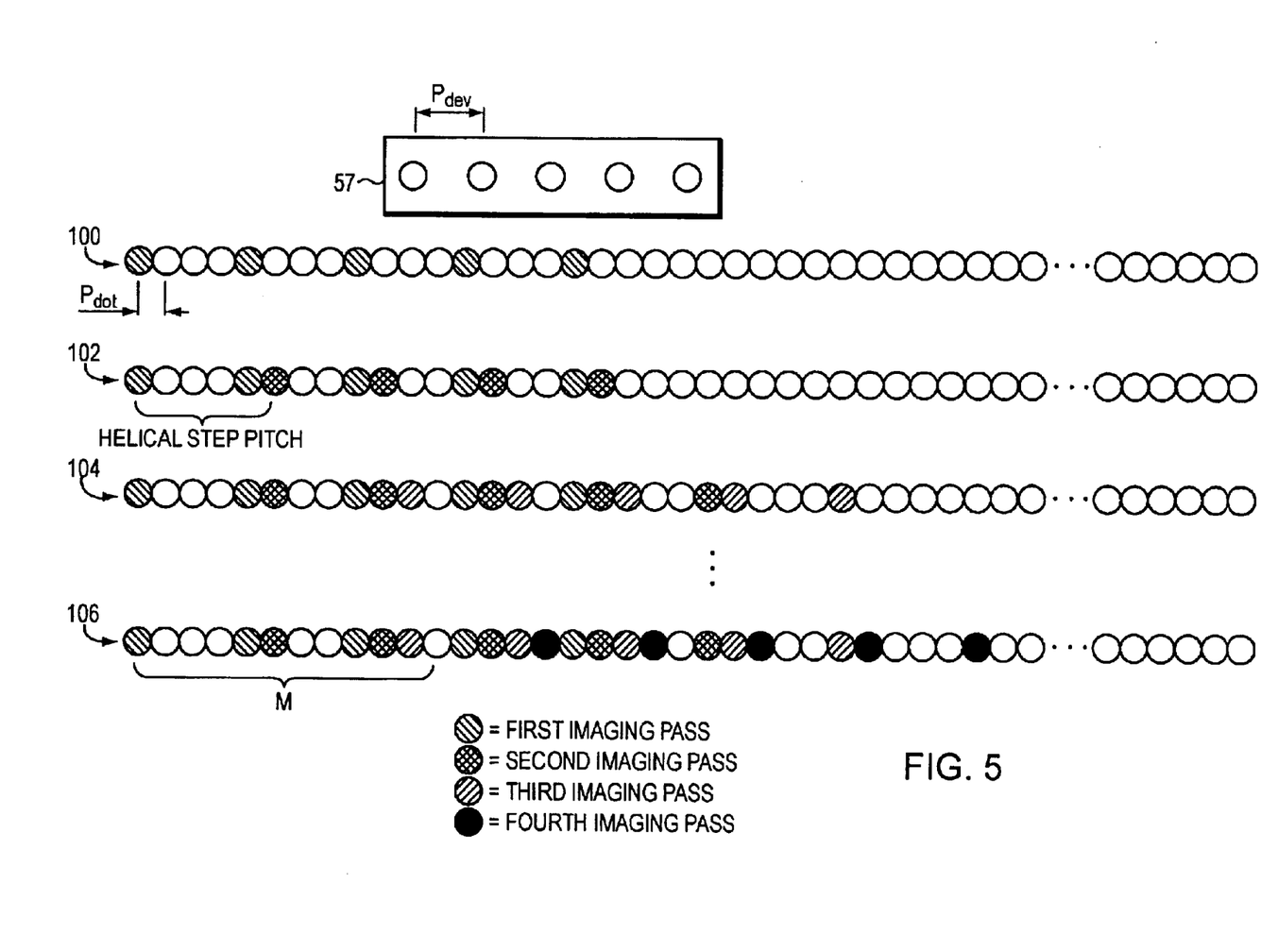
FIG. 5 schematically illustrates interlaced helical imaging of the recording medium in accordance with one embodiment the invention.

Refer now to FIG. 5 which schematically depicts an example of interlaced helical imaging wherein the number of devices 57 is five. As described above, the image resolution can correspond to the dot pitch $P_{dot}$ and the distance between each imaging device 57 is given by $P_{dev}$. In FIG. 5, imaging of the recording medium 50 (not shown) is represented by circles (corresponding to individual image dots) rather than a continuous line. In a first imaging 100, five dots are simultaneously applied to the recording medium 50 by the devices of array 57 (i.e., each device applies one dot), and are therefore separated by a distance corresponding to the device pitch, $P_{dev}$. As will be described below, $P_{dev}$ satisfies the condition $P_{dev}=(N-1) P_{dot}$. In this example, $P_{dev}=4 P_{dot}$. For a second imaging 102, five dots are applied in a similar fashion to the recording medium 50 at a distance, to the right of the dots imaged in 100, defined by the HSP, or the distance traveled by array 57 over one rotation of the recording medium 50. Next, in a third imaging 104, five dots are again applied. The process continues sequentially until all image points are addressed as depicted in a final imaging 106. It is apparent from FIG. 5 that a preamble area M contains unaddressed dots and is not completely imaged.

Figure 6A:
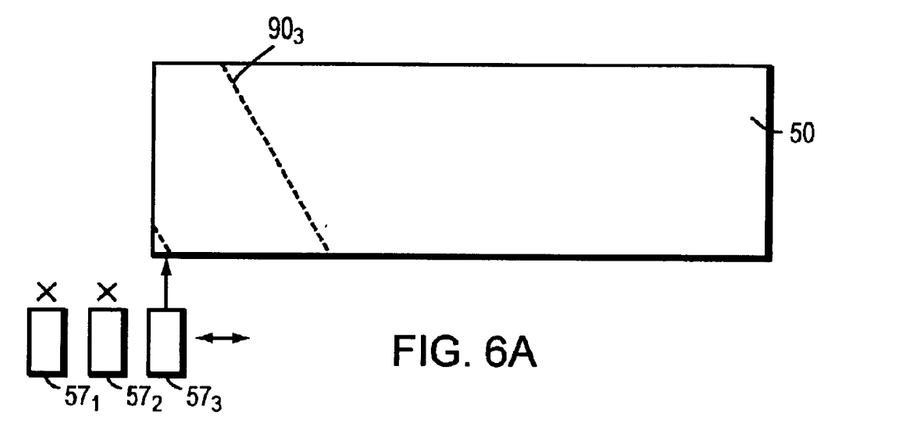
FIGS. 6A–6C schematically illustrate the operation of the imaging system in accordance with the invention.
Figure 6B:
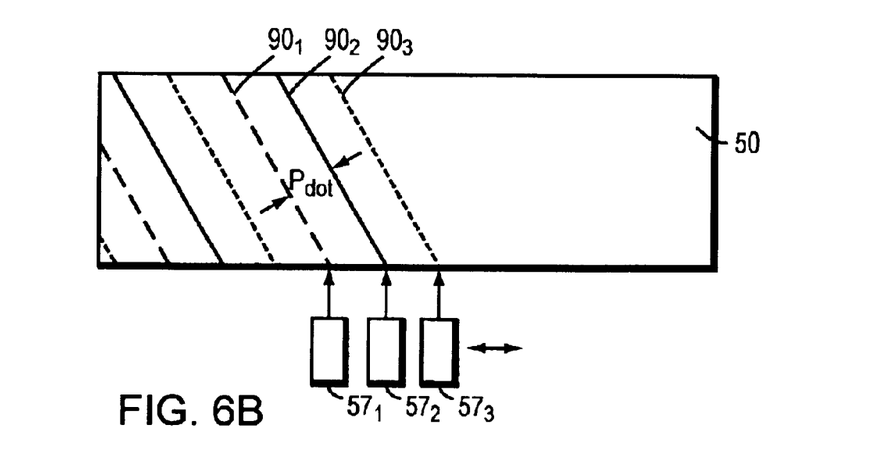
Figure 6C:
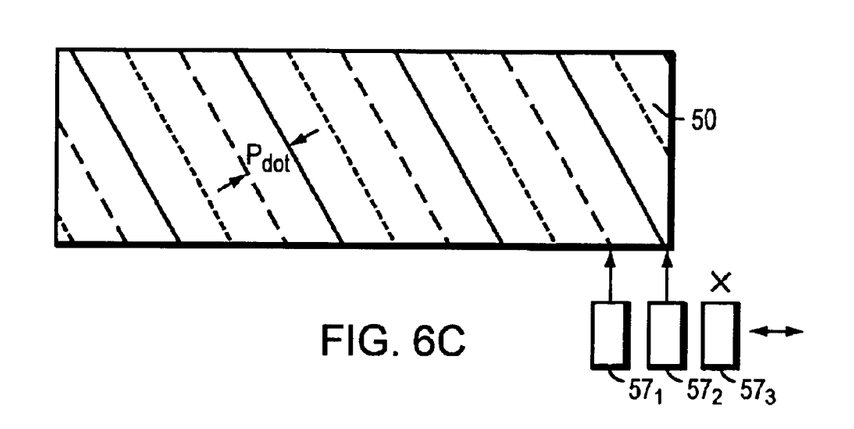

Refer now to FIGS. 6A–6C, which illustrate an alternative depiction of the interlaced imaging according to the invention. During the rotation of cylindrical support 52 at the onset of the imaging cycle (the preamble) and end of the imaging cycle (the postamble) only some devices 57 are active. (An "imaging cycle" is the number of rotations of cylindrical support 52 required to complete imaging of the recording medium 50.) The region between the preamble and the postamble is the intermediate zone in which all devices 57 are active. Imaging of the preamble is shown in FIG. 6A. As the devices 57 traverse from left to right along the recording medium 50, device $57_3$ begins to image first, establishing the onset of a corresponding helical path $90_3$ that will wind continuously around cylindrical support 52. The devices $57_2$, $57_1$ begin imaging along respective helical paths $90_2$, $90_1$ when axial movement brings each device into the appropriate onset position. Accordingly, for a number of initial rotations of the cylindrical support 52, not all the devices 57 in the array are active. Similarly, during imaging of the postamble as shown in FIG. 6C, devices 57 successively cease imaging as they complete their helical paths. So long as the number of devices is not excessive, the extra rotations do not significantly increase overall imaging time relative to the circumferential-ring approach.

It should be understood that the devices 57 are not constantly firing (i.e., active) as they scan through their helical paths. Rather, these paths merely define the image locations over which the devices pass, and they are activated by controller 65 (FIG. 1) in accordance with data defining the image to be reproduced on the recording medium 50. The result of imaging in accordance with the invention, therefore, is a series of interlaced helical paths that collectively pass over all possible image locations.

Figure 7A:
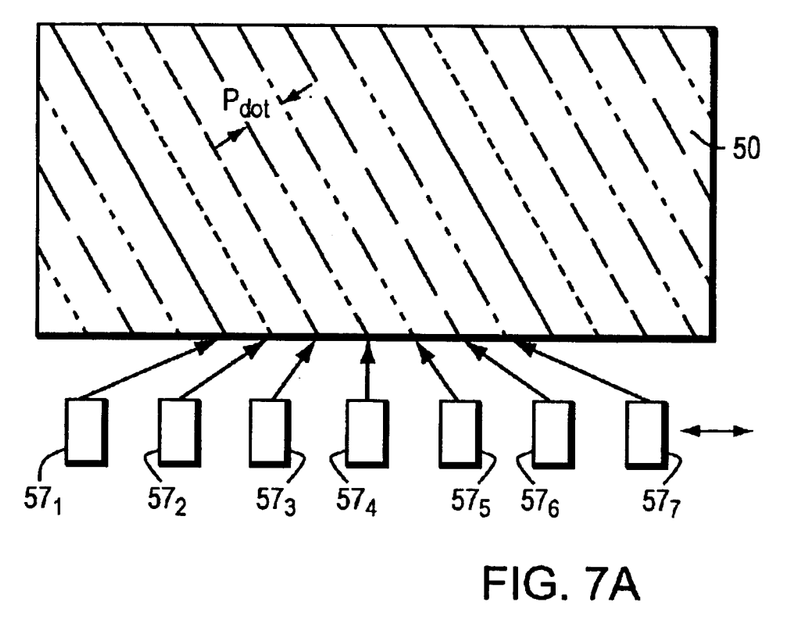
FIGS. 7A–7B schematically illustrate the operation of the imaging system at different selectable resolutions.
Figure 7B:
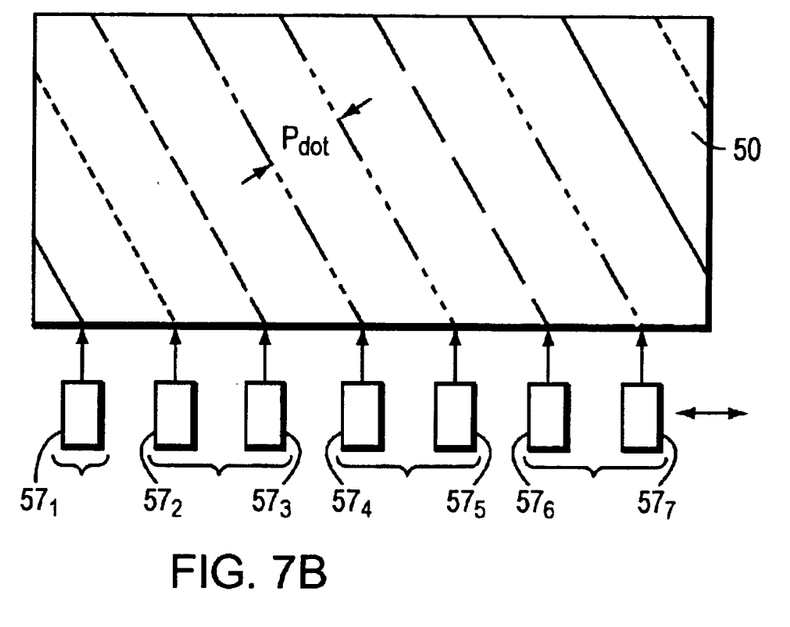

In addition, as schematically depicted in FIGS. 7A and 7B, it is found that some systems having a fixed device pitch can nonetheless be operated to image at different resolutions, which depend on the HSP and the pattern in which the devices are activated. FIGS. 7A and 7B show an array that contains seven devices 57 separated from each other by 60 μm. To image at a dot pitch of 10 μm (for a resolution of 100 dots/mm), a HSP of 70 μm is selected. Referring first to FIG. 7A, and given a left-to-right axial advancement of the imaging devices 57, the last (i.e., rightmost) two devices $57_6$, $57_7$ are activated first, followed by subsequent devices ($57_5$, $57_4$, $57_3$, $57_2$, $57_1$) activated one at a time after successive cylinder rotations. When all devices 57 are active, they trace adjacent helices 90, 10 μm apart.

FIG. 7B shows the same imaging devices 57 of FIG. 7A operated so as to image at a dot pitch of 20 μm (for a resolution of 50 dots/mm); in this case, a HSP of 140 μm is selected. Once again the last two devices ($57_6$, $57_7$) are activated first, followed by subsequent devices ($57_5$, $57_4$, $57_3$, $57_2$) activated two at a time (except the leftmost device, $57_1$, which is activated last and by itself) after successive cylindrical support 52 rotations. Thus, by doubling the HSP and activating devices in pairs in order to obtain complete coverage of the recording medium 50, the resolution may be halved.

For all given configurations of devices 57, two resolutions ($P_{dot1}$, $P_{dot2}$) are available by varying the HSP. A system having a given device spacing $P_{dev}$ and number N of devices is capable of writing in both the N−1 and N+1 helical modes by varying the HSP to match the resolution. The following equations illustrate:

$$P_{dev}=(N-1)P_{dot1}$$

and $$P_{dev}=(N+1)P_{dot2}$$
$$(N-1)P_{dot1}=(N+1)P_{dot2}$$

When writing in the N−1 mode, the following equations apply:

$$P_{dot1}=P_{dev}/(N-1)$$

and $$HSP_1=NP_{dot1}$$

When writing in the N+1 mode, the following equations apply:

$$P_{dot2}=P_{dev}/(N+1)$$

and $$HSP_2=NP_{dot2}$$

Moreover, within a particular helical mode (i.e., N+1 or N−1), the resolutions available for a given number of devices 57 are defined by the condition that the device spacing (i.e., the quantity $(N-1)P_{dot}$ or $(N+1)P_{dot}$, which is itself determined by a highest desired ("primary") resolution $P_{dot}$), when divided by a lower desired ("secondary") resolution, produces an integer. If it is desired to write at two resolutions where one is double the other, an odd number of devices 57 is necessary.

For example, suppose there are seven devices 57, and the primary resolution (expressed in terms of dot spacing, $P_{dot}$) is 10 μm. In the N−1 mode, a 20 μm secondary resolution will also be available, since (7−1)(10)/20=3, an integer. Indeed, a 30 μm secondary resolution will be available as well. Neither of these secondary resolutions would be available with six or eight devices 57, since the necessary condition described above would not be satisfied.

It will therefore be seen that we have developed an imaging system and method of reduced manufacturing cost and complexity while offering multiple selectable imaging resolution and reduced imaging artifacts. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for imaging a recording medium, the apparatus comprising:
    a. means for supporting the recording medium;
    b. an array of imaging devices positioned adjacent to the supporting means;
    c. a mechanism for rotating the supporting means about an axis;
    d. an axial-translation mechanism for drawing the array along the supporting means; and
    e. a controller for causing the imaging devices to apply on the recording medium, at a fixed dot pitch defining a distance between adjacent beams on the recording medium, a pattern of dots corresponding to an image, the controller operating the imaging devices and the axial-translation mechanism so that each device applies dots along a helical path interlacing with the helical paths of the other devices of the array, the pattern of dots corresponding to one of a plurality of selectable image resolutions notwithstanding the fixed dot pitch.

2. The apparatus of claim 1 wherein the helical paths traversed by the devices are identical in pitch but offset with respect to each other.

3. The apparatus of claim 2 wherein the imaging devices are activated sequentially rather than simultaneously, each device addressing space on the recording medium unaddressed by any previously activated device.

4. The apparatus of claim 1 wherein the imaging devices are spaced apart by a device pitch greater than the dot pitch.

5. The apparatus of claim 4 wherein for an array comprising N devices and a primary dot pitch, $P_{dot}$, the device pitch $P_{dev}$ is equal to $(N-1)P_{dot}$.

6. The apparatus of claim 5, wherein additional selectable image resolutions, R, satisfy a condition whereby the quantity $P_{dev}/R$ is equal to an integer.

7. The apparatus of claim 4 wherein for an array comprising N devices and a primary dot pitch, $P_{dot}$, the device pitch $P_{dev}$ is equal to $(N+1)P_{dot}$.

8. The apparatus of claim 7, wherein additional selectable image resolutions, R, satisfy a condition whereby the quantity $P_{dev}/R$ is equal to an integer.

9. The apparatus of claim 1 wherein the array comprises seven devices separated from each other by 60 μm, the resolutions comprising 50 dots/mm and 100 dots/mm.

10. The apparatus of claim 1 wherein the array comprises four devices separated from each other by 50 μm, the resolution comprising 100 dots/mm.

11. A method of imaging a recording medium, the method comprising the steps of:
    a. providing an array of imaging devices;
    b. rotating the recording medium adjacent to the imaging devices and about an axis; and
    c. causing the imaging devices to apply on the recording medium a pattern of dots at a fixed dot pitch defining a distance between adjacent beams on the recording medium corresponding to an image each of the devices applying dots along a helical path interlacing with the helical paths of the other devices of the array, the pattern of dots corresponding to one of a plurality of selectable image resolutions notwithstanding the fixed dot pitch.

12. The method of claim 11 wherein the helical paths traversed by the imaging devices are identical in pitch but offset with respect to each other.

13. The method of claim 12 wherein the imaging devices are activated sequentially rather than simultaneously, each device addressing space on the recording medium unaddressed by any previously activated device.

14. The method of claim 11 wherein the imaging devices are spaced apart by a device pitch greater than the dot pitch.

15. The method of claim 14 wherein for an array comprising N devices and a primary dot pitch, $P_{dot}$, the device pitch $P_{dev}$ is equal to $(N-1)P_{dot}$.

16. The method of claim 15, wherein additional selectable image resolutions, R, satisfy a condition whereby the quantity $P_{dev}/R$ is equal to an integer.

17. The method of claim 14 wherein for an array comprising N devices and a primary dot pitch, $P_{dot}$, the device pitch $P_{dev}$ is equal to $(N+1)P_{dot}$.

18. The method of claim 17, wherein additional selectable image resolutions, R, satisfy a condition whereby the quantity $P_{dev}/R$ is equal to an integer.

19. The method of claim 11 wherein the array of imaging devices comprises seven devices separated from each other by 60 μm, the resolutions comprising 50 dots/mm and 100 dots/mm.

20. The method of claim 11 wherein the array of imaging devices comprises four devices separated from each other by 50 μm, the resolutions comprising 100 dots/mm.

21. Apparatus for imaging a recording medium, the apparatus comprising:
   a. means for supporting the recording medium;
   b. a linear array of seven imaging devices positioned adjacent to the supporting means;
   c. means for rotating the supporting means about an axis;
   d. means for axially translating the array along the supporting means; and
   e. a controller for causing the array of imaging devices to apply on the recording medium, at a fixed dot pitch defining a distance between adjacent beams on the recording medium, a pattern of dots corresponding to an image with one of a plurality of selectable image resolutions, the controller operating the imaging devices and the axial translation mechanism so that each device applies dots along a helical path interlacing with the helical paths of the other devices of the array, the pattern of dots corresponding to one of a plurality of selectable image resolutions notwithstanding the fixed dot pitch.

22. Apparatus for imaging a recording medium, the apparatus comprising:
   a. means for supporting the recording medium;
   b. an array of imaging devices positioned adjacent to the supporting means;
   c. means for rotating the supporting means about an axis;
   d. means for axially translating the array along the supporting means; and
   f. a controller for causing the imaging devices to apply on the recording medium, at a fixed dot pitch defining a distance between adjacent beams on the recording medium, a pattern of dots corresponding to an image, the controller operating the imaging devices and the axial-translation mechanism so that each device applies dots along a helical path interlacing with the helical paths of the other devices of the array, the pattern of dots corresponding to one of a plurality of selectable image resolutions notwithstanding the fixed dot pitch.

* * * * *